US012742587B2

(12) United States Patent
Kim et al.

(10) Patent No.: US 12,742,587 B2
(45) Date of Patent: Sep. 22, 2026

(54) METHOD FOR CHANGING COLOR OF PANEL AND HOME APPLIANCE

(71) Applicant: LG ELECTRONICS INC., Seoul (KR)

(72) Inventors: Changwon Kim, Seoul (KR); Jungjae Lee, Seoul (KR); Jihoon Kim, Seoul (KR); Chanyang You, Seoul (KR); Donggeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 398 days.

(21) Appl. No.: 18/379,896

(22) Filed: Oct. 13, 2023

(65) Prior Publication Data

US 2024/0284575 A1 Aug. 22, 2024

(30) Foreign Application Priority Data

Feb. 16, 2023 (KR) ........................ 10-2023-0020853

(51) Int. Cl.

*F25D 27/00* (2006.01)
*G06F 3/0482* (2013.01)
(Continued)

(52) U.S. Cl.

CPC ......... *F25D 27/005* (2013.01); *G06F 3/0482* (2013.01); *G06F 3/04847* (2013.01); (Continued)

(58) Field of Classification Search

CPC .... H05B 47/155; H05B 47/11; H05B 47/165; H05B 47/175; G06F 3/0482; G06F 3/04847; G06F 3/0481; H04R 1/028; G09F 23/0058; F25D 27/005; F25D 2327/001; F25D 2400/18; F25D 23/02

See application file for complete search history.

(56) References Cited

U.S. PATENT DOCUMENTS 8,789,900 B2 7/2014 Laible et al.
2009/0231248 A1 * 9/2009 Dorff .................. H04M 1/0283 345/83

(Continued)

FOREIGN PATENT DOCUMENTS

CN 1767439 A * 5/2006
EP 4 119 871 A1 1/2023

(Continued)

OTHER PUBLICATIONS

Lotus Lantern, "Apps Lotus Lantern App User Guide", (Mar. 3, 2022), <URL: https://device.report/manual/2319726/>, p. 1-22 (Year: 2022).*

(Continued)

*Primary Examiner* — Mong-Shune Chung

(74) *Attorney, Agent, or Firm* — Birch, Stewart, Kolasch & Birch, LLP

(57) ABSTRACT

The present disclosure relates to a method for changing color of a panel and a home appliance and the method for changing color of a panel includes providing graphic objects and color control buttons corresponding to a plurality of panels of the home appliance; receiving selected color information; and controlling a lighting device to make the panel shine according to received color information.

18 Claims, 15 Drawing Sheets

(51) Int. Cl.

| | |
|---|---|
| ***G06F 3/04847*** | (2022.01) |
| ***H04R 1/02*** | (2006.01) |
| ***H04R 3/00*** | (2006.01) |
| ***H05B 47/11*** | (2020.01) |
| ***H05B 47/155*** | (2020.01) |
| ***H05B 47/165*** | (2020.01) |
| ***H05B 47/175*** | (2020.01) |

(52) U.S. Cl.

CPC ............... *H04R 1/028* (2013.01); *H04R 3/00* (2013.01); *H05B 47/11* (2020.01); *H05B 47/155* (2020.01); *H05B 47/165* (2020.01); *H05B 47/175* (2020.01)

(56) References Cited

U.S. PATENT DOCUMENTS

| | | | | |
|---|---|---|---|---|
| 2013/0141018 | A1* | 6/2013 | Kamii | H05B 47/11 315/360 |
| 2014/0091731 | A1* | 4/2014 | Fushimi | H05B 47/19 315/292 |
| 2021/0274618 | A1* | 9/2021 | Kamada | H05B 47/19 |
| 2022/0292735 | A1* | 9/2022 | Hong | G06Q 30/0641 |
| 2023/0258388 | A1* | 8/2023 | Yu | G02F 1/153 312/405 |

FOREIGN PATENT DOCUMENTS

| | | | |
|---|---|---|---|
| KR | 10-2017-0135394 | A | 12/2017 |
| KR | 10-2018-0047368 | A | 5/2018 |
| KR | 10-2019-0137473 | A | 12/2019 |
| KR | 10-2023-0008261 | A | 1/2023 |
| KR | 10-2023-0011147 | A | 1/2023 |
| KR | 10-2023-0011155 | A | 1/2023 |
| KR | 10-2023-0013410 | A | 1/2023 |
| WO | WO 2022/114493 | A1 | 6/2022 |

OTHER PUBLICATIONS

Xodo, "Adding favorite colors", (Jul. 6, 2022), <URL: https://feedback.xodo.com/support/solutions/articles/35000202910-adding-favorite-colors/>, p. 1-3 (Year: 2022).*

* cited by examiner

METHOD FOR CHANGING COLOR OF PANEL AND HOME APPLIANCE

CROSS-REFERENCE TO RELATED APPLICATION

This application claims the priority benefit of Korean Patent Application No. 10-2023-0020853 filed on Feb. 16, 2023, in the Republic of Korea, which is hereby incorporated by reference in its entirety for all purposes as if fully set forth herein.

BACKGROUND OF THE DISCLOSURE

The present disclosure relates to a method for changing color of a panel and a home appliance.

In general, home appliances, such as refrigerators, clothes managers, dishwashers, and cooking appliances, include a cabinet that accommodates objects to be processed and a door that opens and closes the cabinet.

Whether home appliances are used or not, the components that are most visible to users are doors and other panels that form an outer appearance.

U.S. Pat. No. 8,789,900 discloses a structure in which a decoration panel that forms the outer appearance of a refrigerator is mounted on the front surface of the door of the refrigerator. However, these refrigerators have a problem in that if the user wants to change the outer appearance, the entire decoration panel must be replaced.

The present disclosure relates to changing the outer appearance of home appliances can be changed to reflect the user's taste, to improve user's aesthetic satisfaction.

SUMMARY OF THE DISCLOSURE

An object of an embodiment of the present disclosure is to provide a method for changing color of a panel and a home appliance that can actively reflect the user's taste through interaction between the user and the product in a case where the color of the panel can be implemented in various ways.

A method for changing color of a panel according to an embodiment of the present disclosure includes providing graphic objects and color control buttons corresponding to a plurality of panels of the home appliance, receiving selected color information, and controlling a lighting device to make the panel shine according to received color information.

The color control button can provide selection buttons to adjust the R, G, and B values of color, respectively.

The providing graphic objects and color control buttons corresponding to a plurality of panels of home appliances can include changing the color of a selected graphic object by selecting one of the graphic objects corresponding to the plurality of panels and adjusting the color control button.

The color control button can provide control buttons to adjust the saturation or brightness of the color.

The panel can have a first color when the lighting device is turned off, and the controlling the lighting device can control the lighting device to emit light in a second color so that the panel shines in a third color according to selected color information.

The method for changing color of a panel of claim can further includes recognizing a graphic code including information of the first color and obtaining a correction value for calculating information of the second color.

A method for changing color of a panel according to an embodiment of the present disclosure includes providing graphic objects corresponding to a plurality of panels of the home appliance and a plurality of theme graphic objects representing a plurality of themes, respectively, receiving theme information including color information of a graphic object selected from the plurality of theme graphic objects, controlling a lighting device to make the panel shine according to the received color information.

The theme information can further include sound source information, and the controlling the lighting device can control a speaker to be output according to the sound source information.

The theme information can further include control information for varying the color and brightness of the plurality of light sources constituting the lighting device over time, and the controlling the lighting device can control to implement dynamic effects on the panel according to the control information.

The providing the plurality of theme graphic objects can further include a selecting button for setting the time at which the lighting device is operated, and wherein, in the controlling the lighting device, the lighting device can operate according to the received operation time.

The method for changing color of a panel can further include a night mode step of controlling the brightness of the lighting device to be darker than before when the illuminance value detected by the illuminance sensor is below a set value.

The night mode step can include, providing information about the illuminance value detected by the illuminance sensor, displaying a display to select whether to operate the night mode when the illuminance value is the detected illuminance value or less, when a user selects night mode operation, changing the setting value to the detected illuminance value or less.

The method for changing color of a panel can further include activating a night mode when the illuminance value detected by the illuminance sensor is the changed setting value or less.

A home appliance according to an embodiment of the present disclosure includes a cabinet having storage space, a door opening and closing the storage space, and a controller, in which the door includes a panel forming the front surface and including a lighting device, and the controller is configured to control the lighting device to make the panel shine with a color according to the color information when receiving color information selected by the user.

The panel can have a first color when the lighting device is turned off, and the controller can be controlled to control the lighting device to emit light in a second color so that the panel shines in a third color according to selected color information.

The controller can be configured to receive sound source information selected by the user and to control a speaker to output sound according to the sound source information.

The lighting device can be controlled to receive control information to vary the color and brightness of a plurality of light sources constituting the lighting device over time, and control the lighting device to implement a dynamic effect on the panel according to the control information.

The controller can be configured to control to a night mode where the brightness of the lighting device is controlled to be dimmer than before, if the illuminance value detected by the illuminance sensor is the set value or less, provide information about the illuminance value detected by the illuminance sensor to the user's remote device, and change the setting value to the detected illuminance value when the user selects night mode operation at the detected illuminance value.

According to one embodiment of the present disclosure, a user can intuitively and conveniently select a color applied to a panel of a home appliance.

According to an embodiment of the present disclosure, the user's taste can be actively reflected through interaction between the user and the product, thereby improving the user's aesthetic satisfaction.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE EMBODIMENTS

Hereinafter, specific embodiments of the present disclosure will be described in detail with drawings. However, the present disclosure cannot be said to be limited to the embodiments in which the spirit of the present disclosure is presented, and other degenerative disclosures or other embodiments included in the scope of the present disclosure can be easily suggested by adding, changing, or deleting other components.

The refrigerator and home appliance of the present disclosure includes a panel equipped with a lighting device on the front surface, and a color set by a user through a remote device can be implemented on the panel.

Home appliances of the present disclosure can include refrigerators, air conditioners, air purifiers, vacuum cleaners, cooking appliances, dishwashers, clothes care machines, washing machines, or the like. However, the type of home appliance is not limited to the above example, and can be included without limitation as long as it is provided in the user's home and helps the user with housework.

First, the refrigerator is described as a type of home appliance, and the description of the refrigerator can also be applied to other types of home appliances.

Figure 1:
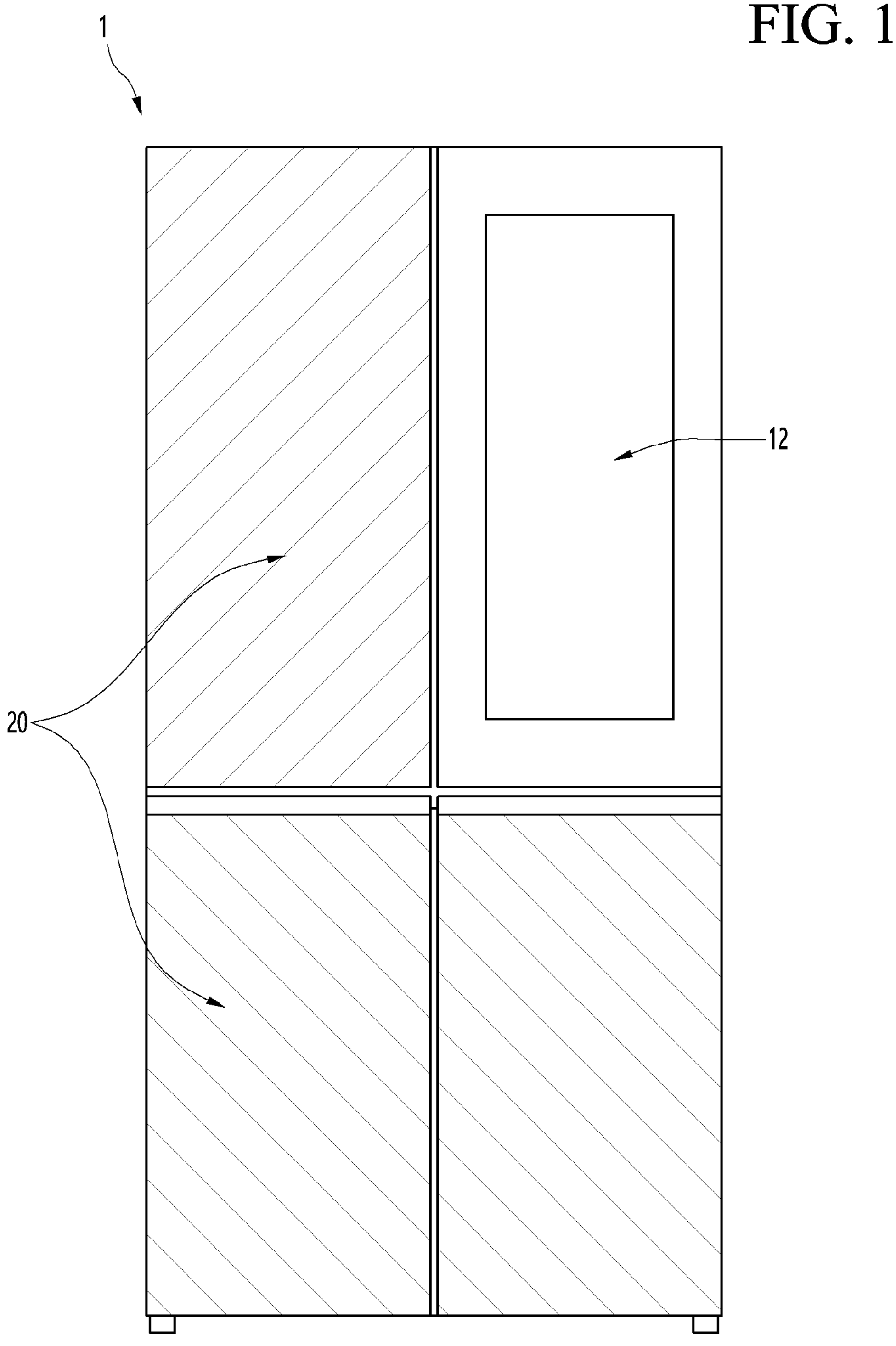
FIG. 1 is a front view illustrating a refrigerator according to an embodiment of the present disclosure.

FIG. 1 is a front view illustrating a refrigerator according to an embodiment of the present disclosure.

The refrigerator 1 is a home appliance that keeps food fresh by including a cabinet 10 with a storage space for storing food and a cold air supply device that supplies cold air to the storage space.

At least one side of the storage space provided in the cabinet 10 can be open for introduction and withdrawal of food. The openable side can be opened and closed by the door 20.

The door 20 can include a door body 40 and a panel 30. The panel 30 can be detachably coupled to the door body 40.

The panel 30 can be provided on the front surface of the door 20, and the door body 40 can be provided on the rear surface of the door 20, that is, facing the inside of the cabinet 10. The front surface of the door 20 can refer to the side visible to the user when the door 20 is closed, and the rear surface of the door 20 can refer to the side facing the storage space when the door 20 is closed.

The refrigerator 1 can have a plurality of doors 20. For example, the refrigerator can include a pair of doors 20 that open and close the upper storage space, and a pair of doors 20 that open and close the lower storage space. However, the present disclosure is not limited to this, and the refrigerator 1 can have various combinations of doors 20.

The door 20 can be connected by a hinge device and rotatably mounted on the cabinet 10, or can be provided as a drawer-type door 20 that can be introduced and withdrawn.

The door 20 has a structure that allows the front surface to selectively emit light, and can be configured to shine with a set color or brightness. The user can change the overall outer appearance of the refrigerator 1 by manipulating the front color or brightness of the door 20 to change.

Meanwhile, the door on at least one side can be formed to enable penetration into the interior of the refrigerator. A see-through portion 12 can be formed on the door 20, which is an area where the storage space on the rear surface of the door and/or the interior space of the refrigerator can be seen. The see-through portion 12 can be selectively transparent or opaque depending on the user's manipulation, and food stored in the refrigerator can be identified through the see-through portion 12.

Figure 2:
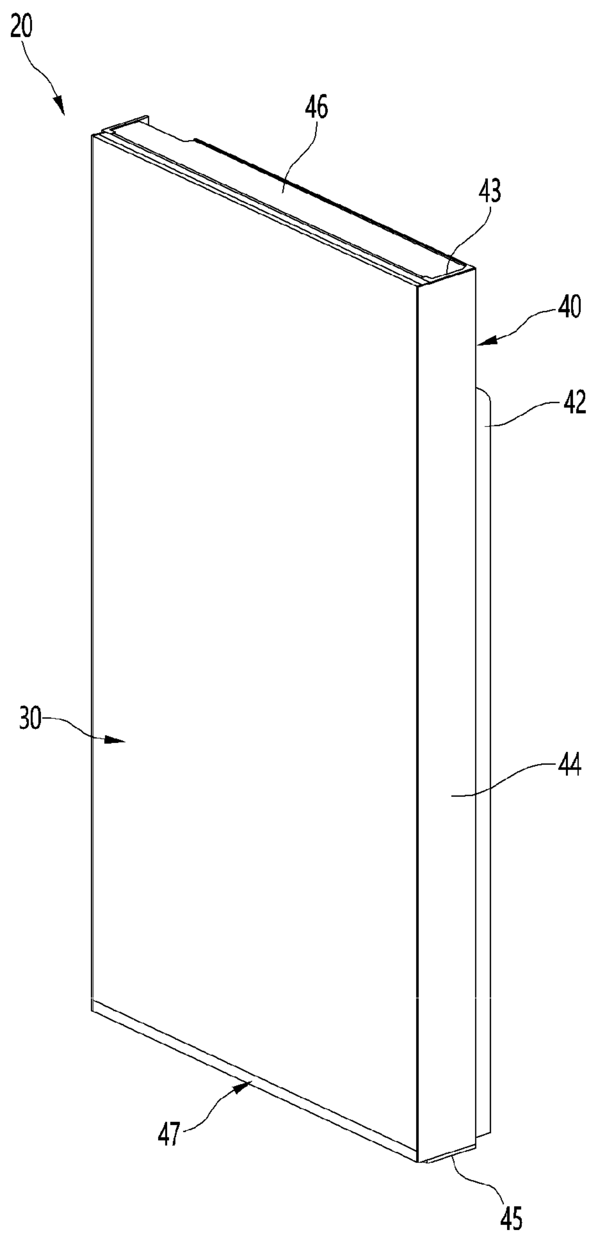
FIG. 2 is a perspective view illustrating the door.
Figure 3:
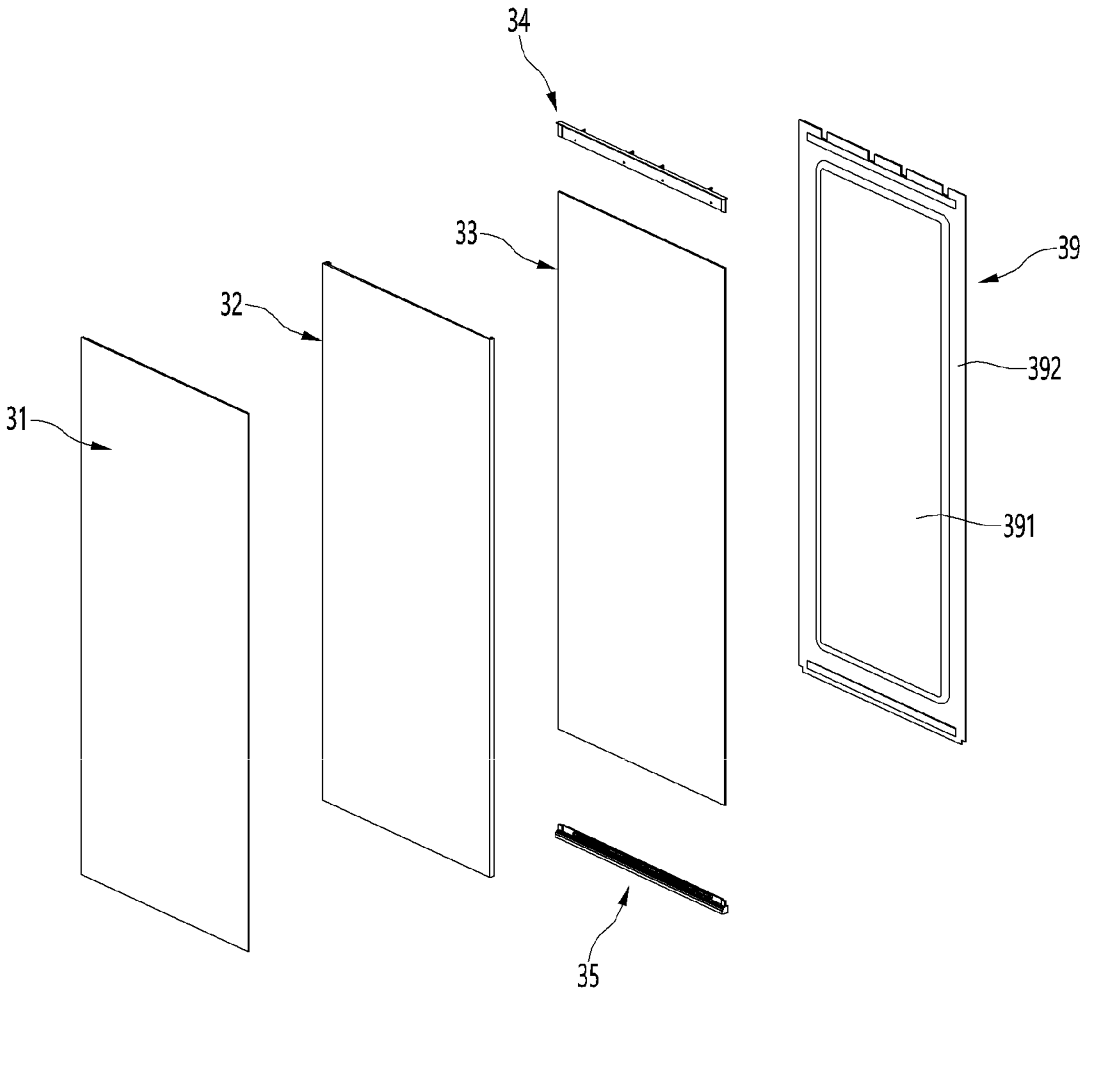
FIG. 3 is an exploded perspective view illustrating a state where the panel forming the front surface of the door is separated.
Figure 4:
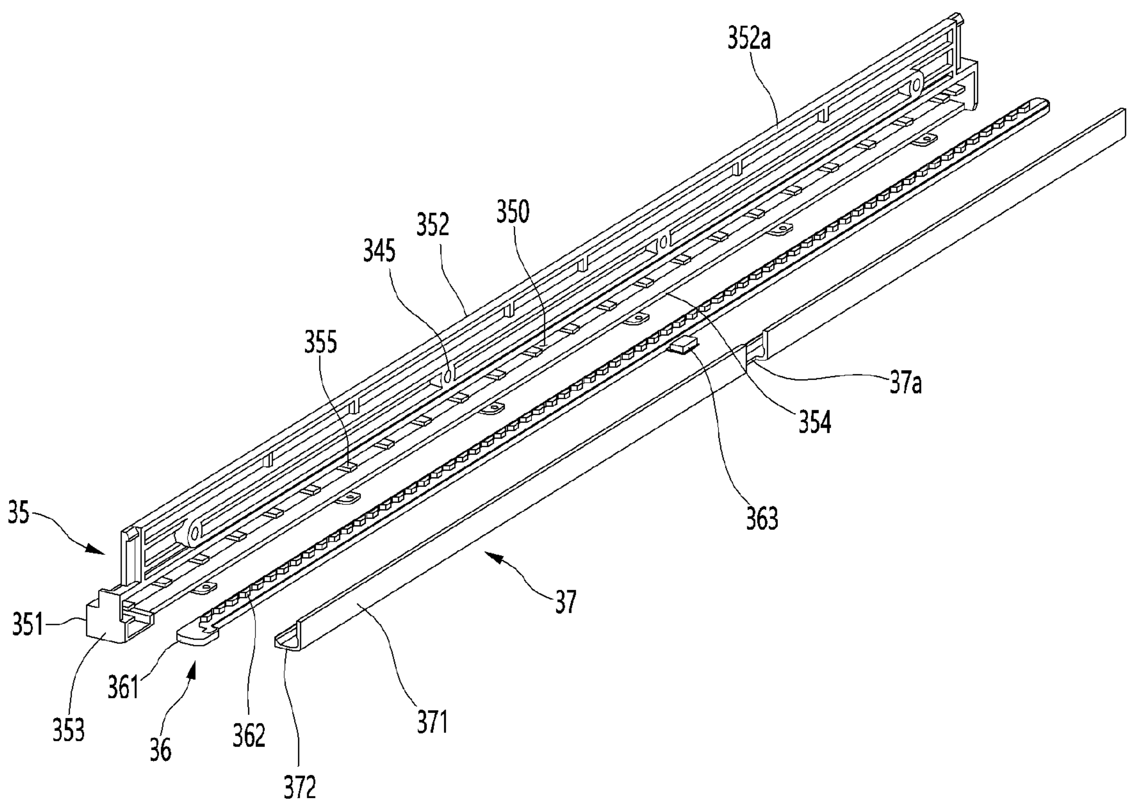
FIG. 4 is an exploded perspective view illustrating the lower bracket, lighting device, and lighting supporter, which are components of the panel.

FIG. 2 is a perspective view illustrating the door, FIG. 3 is an exploded perspective view illustrating a state where the panel forming the front surface of the door is separated, and FIG. 4 is an exploded perspective view illustrating the lower bracket, lighting device, and lighting supporter, which are components of the panel.

The door 20 can have various colors, and when the refrigerator 1 includes a plurality of doors 20, each of the plurality of doors 20 can have a different color. The color of the door 20 can refer to the color of the panel 30 shown to the user when the door 20 is closed.

The door body 40 can include a body plate 41 on which the panel 30 is mounted, and a door liner 42 that forms the rear surface of the door 20. The door body 40 can include side decorations 44 forming both left and right sides.

The door body 40 can include an upper cap decoration 43 and a lower cap decoration 45 that form the upper and lower surfaces of the door body 40, respectively. The open upper surface of the upper cap decoration 43 can be shielded by the decoration cover 46.

The panel 30 can include a front plate 31 that forms the outer appearance of the front surface, a lighting device 36 (see FIG. 4) that emits light (e.g., toward the front plate) so that the front plate 31 shines, and a light guide plate 33 that guides the light emitted from the lighting device 36.

The panel 30 can further include a support member 32 mounted between the light guide plate 33 and the front plate 31.

The panel 30 can further include an upper bracket 34 forming the upper surface of the panel 30 and a lower bracket 35 forming the lower surface of the panel 30.

The panel 30 can further include a back cover 39 forming a rear surface.

The front plate 31 can be transparent so that light reflected by the light guide plate 33 can be transmitted. The front plate 31 can prevent the internal components of the panel 30 from being visible to the outside through the front plate 31 due to the color of the front plate 31 itself, when the lighting device 36 is turned off.

The support member 32 can be positioned directly between the light guide plate 33 and the front plate to maintain a certain distance between the light guide plate 33 and the front plate 31. The support member 32 can be formed of any known material capable of transmitting light.

The lighting device 36 is configured to emit light toward the light guide plate 33. The lighting device 36 can be provided inside the lower bracket 35, and can be assembled and installed together with the lower bracket 35 while being mounted on the lower bracket 35.

The lower bracket 35 can include a lower bracket front surface portion 351, a lower bracket rear surface portion 352, a lower bracket side portion 353, and a lower bracket lower surface portion 354.

A panel support portion **351*a* is formed at the upper end of the lower bracket front surface portion 351 to support the lower end of the panel 31**.

The lower bracket rear surface portion 352 supports the light guide plate 33 from the rear and can be combined with (e.g., integral with) the back cover 39. A lower bracket screw hole 345 into which a plurality of screws are fastened can be formed in the lower bracket rear surface portion 352.

A bracket opening **352*a* can be formed in the lower bracket rear surface portion 352. The lighting device 36 can be introduced and withdrawn through the bracket opening 352*a*. The bracket opening 352*a* can be shielded by the back cover 39**.

The lower bracket lower surface portion 354 can form the bottom surface of the space where the lighting device 36 is mounted.

A light guide plate support portion 355 that supports the lower end of the light guide plate 33 can be formed on the lower bracket 35. A plurality of light guide plate support portions 355 can protrude rearward at regular intervals along the lower bracket front surface portion 351.

The lighting device 36 can include a substrate 361 and a plurality of light sources 362 arranged on the substrate 361. The light source can be composed of RGB LED (i.e., Red Green Blue light emitting diode) and can emit light of various colors. Each light source provided in the lighting device 36 can be controlled independently.

A light supporter 37 can be provided inside the lower bracket 35. The light supporter 37 can support the lighting device 36 inside the lower bracket 35. The light supporter 37 can be made of a metal material to dissipate heat generated by the lighting device 36 by conduction. That is, the light supporter 37 can also act as a heat sink, due to being comprised of a material, such as a metal material, having relatively high level of thermal conductivity, such as iron, copper, and the like.

The light supporter 37 can include a first supporting portion 372 supporting the lighting device 36 and a second supporting portion 371 in contact (e.g., in direct contact) with the back cover 39.

The light supporter 37 has an opening **37*a* through which the connector 363 of the lighting device 36 can pass. The connector 363 is electrically connected to the controller and can control the lighting device 36** according to signals from the controller.

When the lighting device 36 is turned on according to an instruction from the controller 13, the light emitted from the plurality of light sources 362 can be emitted toward the lower end of the light guide plate 33. Light incident through the lower end of the light guide plate 33 can be diffused and reflected along the light guide plate 33 and can move along the light guide plate 33.

Light directed forward through the light guide plate 33 shines on the panel 31, and the front surface of the door 20 can shine with a set brightness and/or color.

Figure 5:
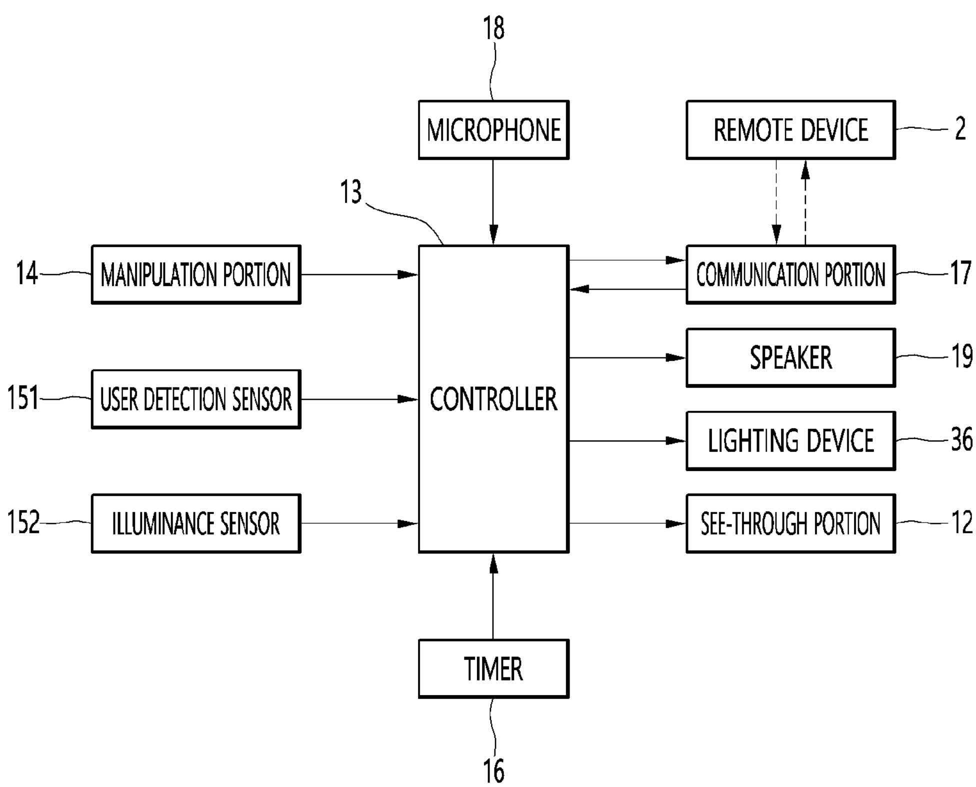
FIG. 5 is a block diagram illustrating the flow of control signals of a refrigerator.

FIG. 5 is a block diagram illustrating the flow of control signals of a refrigerator.

When the lighting device 36 is turned off, the color of the outer appearance of the front surface of the refrigerator 1 can be expressed by the color of the panel 30 itself. The color of the panel 30, when the lighting device 36 is turned off, can be referred to as the first color.

When the lighting device 36 is operated, the color of the panel 30 can be changed depending on the color of the light emitted from the lighting device 36. At this time, the color of the light emitted from the lighting device 36 can be referred to as the second color. Also, the color of the panel that is changed when the lighting device 36 is turned on can be said to be the third color.

The second color can be different from the third color, the second color can be different from the first color, and the second color corrected in consideration of the first color can be irradiated by the lighting device 36 to implement the third color of the panel 31 selected by the user.

In detail, the panel 30 has a first color when the lighting device 36 is turned off, and the lighting device 36 can be controlled to emit light with a second color so that the panel shines with a third color according to information of the selected color.

The color of the panel 31 can be determined by selective operation of the lighting device 36. As an example, the lighting device 36 can be operated and set through a remote device 2 away from the refrigerator 1.

The refrigerator 1 can communicate with the remote device 2 through the communication portion 17 connected to the controller 13, and the user can control the operation of the lighting device 36 through the remote device 2.

The communication portion 17 can have a structure capable of communicating in at least one of wired, wireless, and short-range communication (Bluetooth, Wi-Fi, Zigbee, NFC, or the like). Additionally, the remote device 2 can be a variety of devices capable of communication, such as a dedicated terminal, mobile phone, tablet, portable PC, desktop PC, remote controller, or Bluetooth speaker.

The user can input a color through the manipulation portion 14 provided in the refrigerator 1 with or without using the remote device 2.

The lighting device 36 can also be operated by a sensor 151 (e.g., a proximity sensor, a light sensor, a capacitive sensor, etc.). For example, the sensor 151 can be a user detection sensor 151 that detects user access.

When the user approaches the refrigerator 1 by a set distance, the user detection sensor 151 can detect the user, and the user detection sensor 151 can transmit a signal to the controller 13, and cause the lighting device 36 to turn on.

The lighting device 36 can be operated according to the illuminance detected by the illuminance sensor 152. When the illuminance detected by the illuminance sensor 152 falls below the set illuminance and it becomes dark, the controller 13 can turn on the lighting device 36.

The controller 13 can be connected to the microphone 18. The plurality of light sources 362 can be made to shine in a set color according to the voice signal received from the microphone 18. That is, particular colors can be set to different frequencies, such that when a user speaks (e.g., sings or talks) in a first set frequency, the controller, which receives a signal from the microphone indicative of the first set frequency, controls the plurality of light sources 362 to emit a first preset color.

The controller 13 can be connected to the speaker 19, and the speaker 19 can be as known in the art. The controller 13 can control music to be output to the speaker 19 in conjunction with the operation of the lighting device 36.

The lighting device 36 can be turned on and off at a time set by the timer 16.

Figure 6:
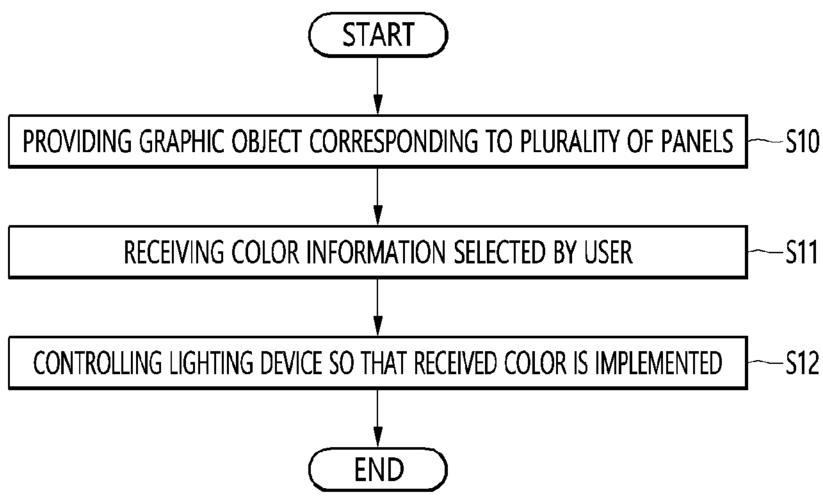
FIG. 6 is a flowchart for explaining a method of controlling the color of the panel with My Collection according to the first embodiment.
Figure 7:
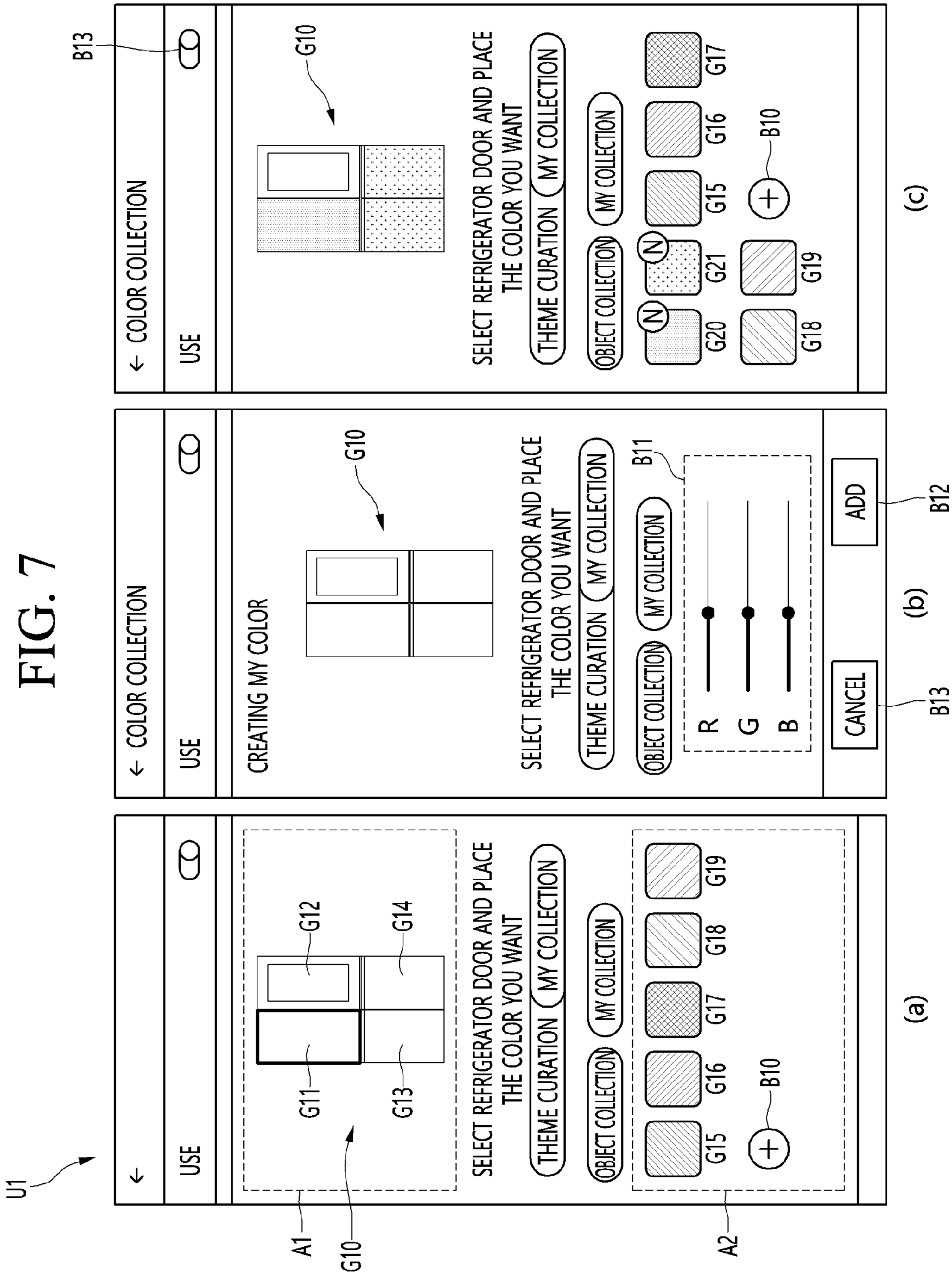
FIG. 7 is a diagram illustrating an example of a user interface for explaining a method of controlling the color of the panel with My Collection according to the first embodiment.

FIG. 6 is a flowchart for explaining a method of controlling the color of the panel with My Collection according to the first embodiment, and FIG. 7 is a diagram illustrating an example of a user interface for explaining a method of controlling the color of the panel with My Collection according to the first embodiment.

In a home appliance according to one embodiment, a user can select a desired color for each of a plurality of panels (e.g., of the plurality of doors 20) through a remote device 2. Additionally, the controller 13 can control the lighting device 36 to implement the color selected by the user.

At this time, the user can save the desired color by adjusting the R, G, and B areas. The method by which the user saves colors by adjusting the RGB area can also be referred to as the My Collection method, which is illustrated in FIG. 7.

My collection control method includes providing a graphic object corresponding to a plurality of panels included in the home appliance (S10), receiving the RGB value selected by the user (S11), and controlling the lighting device to implement colors with the RGB values received on the panel (S12).

Before receiving the RGB value selected by the user, the user selects the desired color by adjusting the RGB value of the color.

The providing a graphic object (S10) can provided a user interface U1 (shown in FIG. 7) that allows you to simulate color combinations by applying the desired color to each of the plurality of panels along with information about the home appliance to the user's remote device 2.

A user interface can refer to a graphical user interface. A graphical user interface or graphical object provided in one embodiment can be used to provide information to the user or receive the user's selection.

The first area A1 of the user interface U1 can display the shape of a refrigerator having a door combination corresponding to the home appliance currently being used by the user. For example, in the case of a door combination consisting of four doors, a first graphic object G10 representing the shape of a refrigerator with four doors can be displayed, as illustrated in FIG. 7.

This first graphic object G10 can include a first door graphic object G11, a second door graphic object G12, a third door graphic object G13, and a fourth door graphic object G14 corresponding to each of the four doors.

As illustrated in (a) of FIG. 7, when the user selects any one of the first to fourth door graphic objects G11, G12, G13, and G14 and selects color through the graphic objects S10 displayed in the second area A2, the selected color can be applied to the selected door graphic object.

When the user selects one of the first to fourth door graphic objects G11, G12, G13, and G14, a display indicating that the selected door graphic object has been selected can appear. For instance, in (a) of FIG. 7, first door graphic object G11 is bolded, which indicates that it has been selected by a user.

Graphic objects G15, G16, G17, G18, and G19 for pre-stored colors can be displayed in the second area A2. The pre-stored colors can be colors previously saved, for instance in memory of the refrigerator 1, by the user or recently selected colors.

In addition, the user can immediately check the user interface U1 through the remote device 2, as well as by making the panel 30 shine, in a selected color.

The user interface U1 can display an add color button B10 for adding a new color, which is shown in FIG. 7 as a "+" or plus button.

The user interface U1 allows users to select the color a user wants by directly adjusting RGB values. When the user clicks the add color button B10, a color selection button B11 appears in the second area A2, and the color selection button B11 can adjust RGB values can be displayed in the second area A2, as illustrated in (b) of FIG. 7.

For example, as the red color control button moves to the right, the color of the panel 30 can be displayed closer to red. Additionally, as the green color control button moves to the right, the color of the panel 30 can be displayed closer to the green color. Additionally, as the blue color control button moves to the right, the color of the panel 30 can be displayed closer to blue.

The providing graphic objects and color control buttons corresponding to a plurality of panels of the home appliance includes selecting one of the graphic objects corresponding to the plurality of panels, and, when the color control button is controlled, changing the color of the selected graphic object.

In detail, the door graphic object selected by the user among the first to fourth door graphic objects G10 can be changed to a color corresponding to the RGB value of the user's color selection button B11.

The user interface U1 can display an add button B12 for adding the RGB value selected by the user and a cancel button B13 for returning to the previous step.

When the user clicks the add button B12, the color added by the user can be added and displayed as graphic objects G20 and G21 in the second area A2, as illustrated in (c) of FIG. 7.

If the user clicks the cancel button B13, the user can return to the screen in (a) of FIG. 7 without saving the RGB value information selected by the user.

The user interface U1 can include a use button.

The user can add a color and select the use button to apply the color to the home appliance 1.

The user can select a desired color graphic object among the color graphic objects G10 displayed in the second area A2 while selecting the door graphic object G10 whose color is desired to be changed.

When the user completes the selection, the remote device 2 can transmit color information corresponding to the plurality of panels to the refrigerator 1 (S11). This color information includes RGB values selected by the user.

The controller 13 can control the lighting device 36 based on the received information to make the panel 30 shine with a color set by the user (S12). Accordingly, the user can immediately check the home appliance to which the selected color is applied in the remote device 2.

Figure 8:
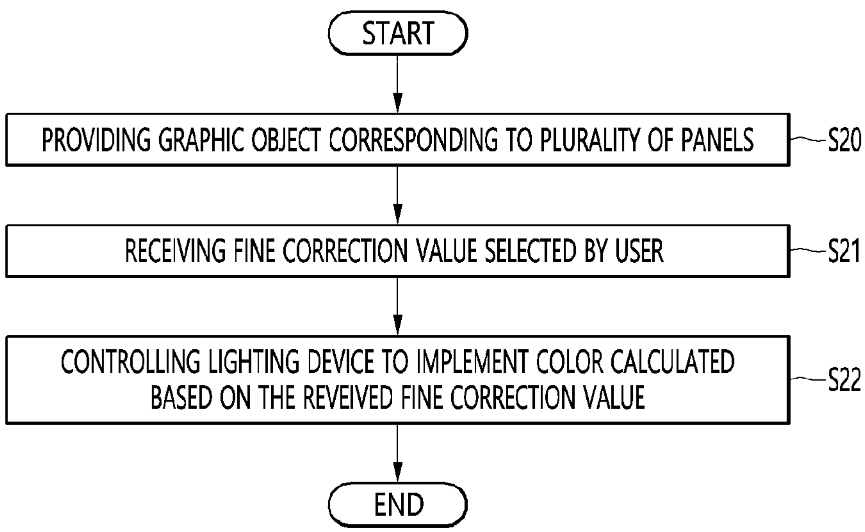
FIG. 8 is a flowchart for explaining a method of controlling the color of the panel by fine-tuning color tone according to the second embodiment.
Figure 9:
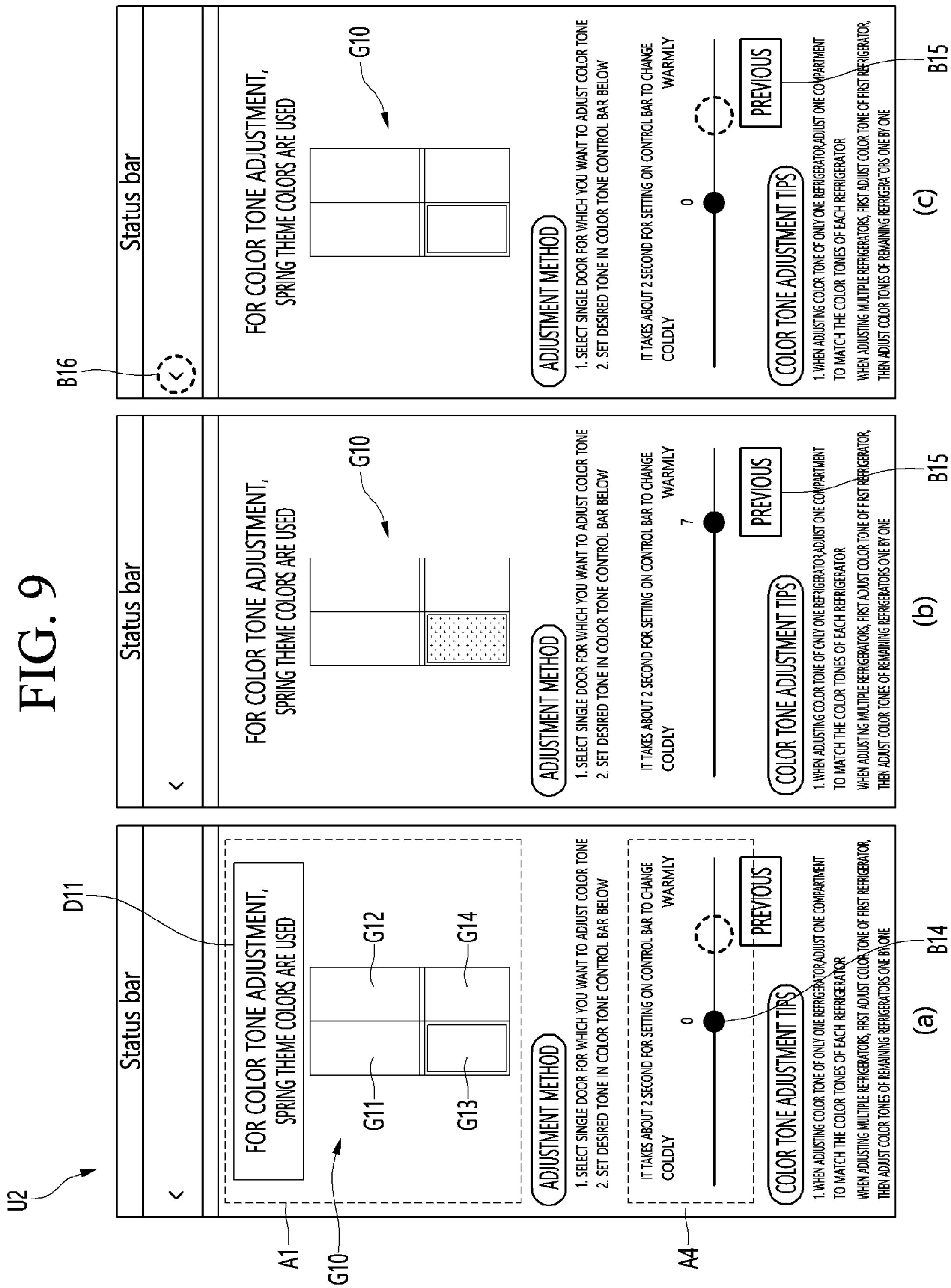
FIG. 9 is a diagram illustrating an example of a user interface for explaining a method of controlling the color of the panel by fine-tuning color tone according to the second embodiment.

FIG. 8 is a flowchart for explaining a method of controlling the color of the panel by fine-tuning color tone according to the second embodiment, and FIG. 9 is a diagram illustrating an example of a user interface for explaining a method of controlling the color of the panel by fine-tuning color tone according to the second embodiment.

The home appliance according to one embodiment can adjust the brightness (e.g., blackness) or chromaticness of the color of the panel 30 so that the user can implement the color desired for each panel. This method can also be called a color tone fine adjustment method.

The controller 13 is linked with the remote device 2, so that when the user adjusts the color of the panel 30 through the remote device 2, the lighting device 36 can be controlled with the adjusted color. Accordingly, the user can immediately check the changing color of the panel 30 and adjust the color through the remote device 2.

My collection control method includes providing a graphic object corresponding to a plurality of panels included in the home appliance (S20), receiving a fine correction value selected by the user (S21), and controlling the lighting device to implement the color with the fine correction value received on the panel (S22). The fine correction value can be the RGB value of the color selected by the user.

The providing a graphic object (S20) can provide a user interface U2 that can finely adjust the desired color for a plurality of panels of home appliances to the user's remote device 2.

The third area A3 of the user interface U2 can display the shape of a refrigerator having a door combination corresponding to the home appliance currently being used by the user.

Additionally, a graphic object G10 to which the color currently being applied is applied can be displayed on each of the plurality of panels. This graphic object G10 can include a first door graphic object G11, a second door graphic object G12, a third door graphic object G13, and a fourth door graphic object G14.

The color information D11 currently in use can be displayed in the third area A3. In detail, if the color currently applied to the panel 30 is a My Collection color, the color name saved by the user can be displayed. Alternatively, if the color currently applied to the panel 30 is a pre-stored theme color, the name corresponding to the selected color can be displayed.

As illustrated in (a) of FIG. 9, when the user selects the control button B14 displayed in the fourth area A4 and moves the control button in the left or right direction, the chromaticness of the color of the first to fourth door graphic objects G10 can be changed corresponding to the control button B14. A number can be displayed above the control button B14 indicating the amount of change from an original setting, with the original setting being any number, but is shown in (a) of FIG. 9 as "0" or zero.

Of course, in some cases, the control button B14 displayed in the fourth area A4 can further include a button for adjusting the brightness. In this case, the chromaticness of the entire first to fourth door graphic objects G10 can be changed in correspondence with the control button B14.

At this time, the remote device 2 and the home appliance 1 can be linked to each other through the communication portion 17.

When the user adjusts the control button B14, the remote device 2 can transmit the changed chromaticness value to the communication portion 17. The controller 13 can receive the chromaticness value through the communication portion 17 and control the lighting device 36 according to the changed chromaticness value. Here, the chromaticness value can be an RGB value of a finely adjusted color.

Accordingly, the user can check that the color of the panel 30 of the home appliance changes while adjusting it through the remote device 2.

Additionally, as illustrated in (b) of FIG. 9, the user can select any one of the first to fourth door graphic objects G10. Also, if the control button B14 displayed in the fourth area A4 is selected and moved in the left and right direction, a finely adjusted color can be applied to the selected door graphic object G10.

The user can select one of the door graphic objects G10 in the third area A3. The chromaticness value of the color being applied to the selected door graphic object G10 can be displayed in the fourth area A4.

The user interface U2 can include a previous button (i.e. "original") B15. When the user clicks the previous button B15, the finely adjusted color is not applied to the selected panel, and instead, the originally applied color can be returned.

Additionally, the user interface U2 can include a cancel button B16, shown at the top portion of U2 below "Status bar," and is shown in the form of arrow, but can have any form. When the user clicks the cancel button B16, the finely adjusted color is not applied to the entire panel, as illustrated in (c) of FIG. 9, and the original applied color can be returned.

Figure 10:
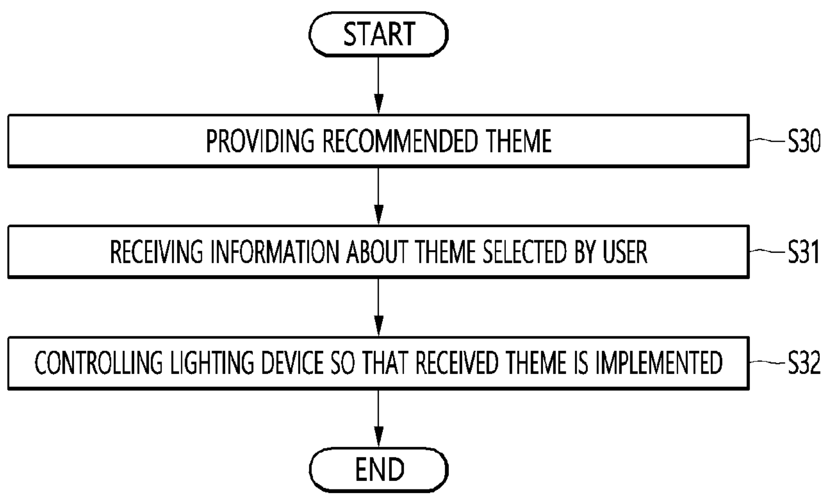
FIG. 10 is a flowchart for explaining a method of controlling the color of the panel with an artist collection according to the third embodiment.
Figure 11:
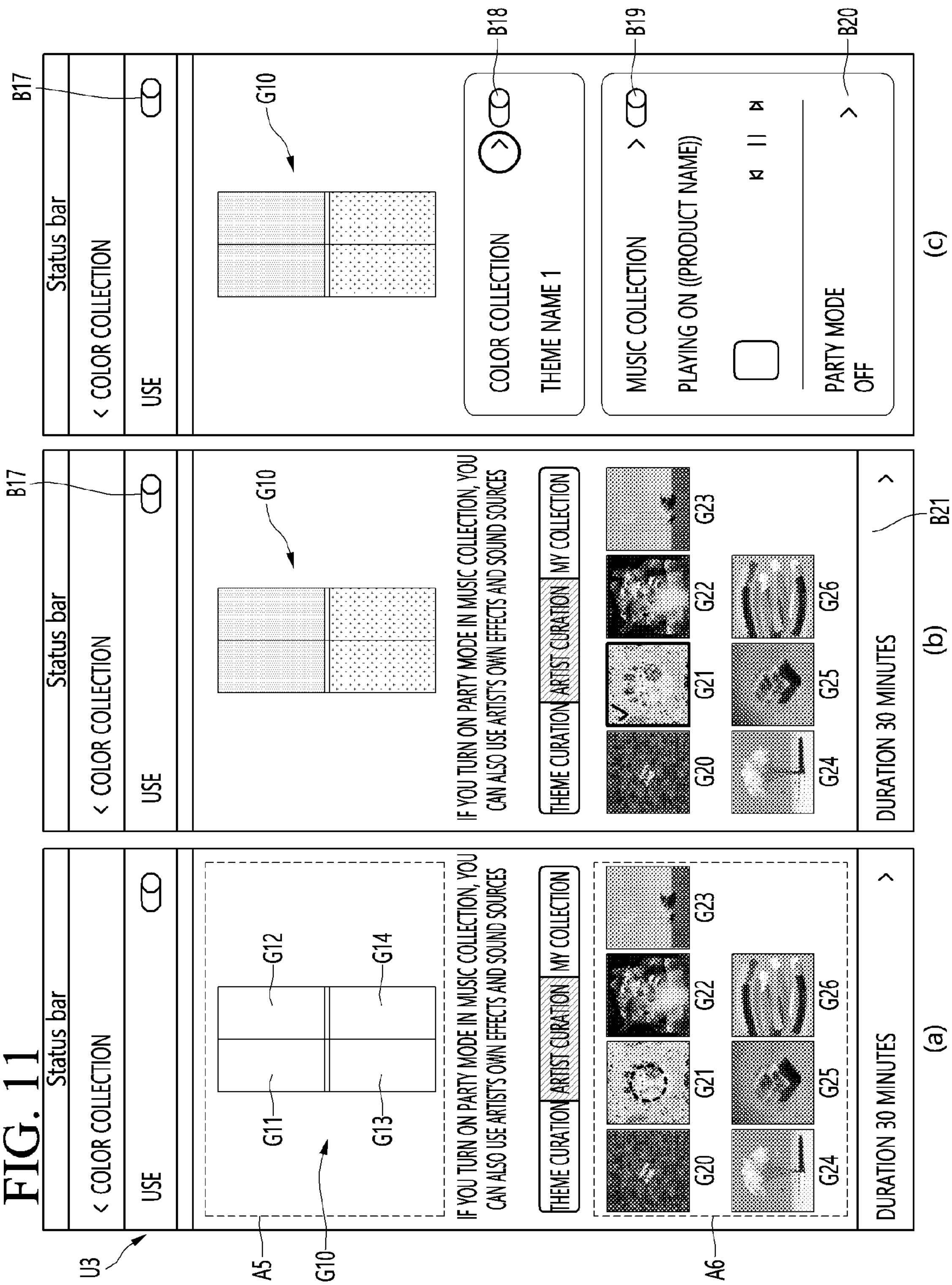
FIG. 11 is a diagram illustrating an example of a user interface for explaining a method of adjusting the color of the panel with an artist collection according to the third embodiment.

FIG. 10 is a flowchart for explaining a method of controlling the color of the panel with an artist collection according to the third embodiment, and FIG. 11 is a diagram illustrating an example of a user interface for explaining a method of adjusting the color of the panel with an artist collection according to the third embodiment.

The home appliance according to one embodiment recommends a theme that includes a combination of colors for a plurality of panels 30, a sound source output to the speaker 19, and a dynamic image implemented in the panel 30, and the selected theme can be implemented.

In the home appliance 1, each of a plurality of light sources 362 can be independently controlled according to the intensity, beat, or pitch of the sound source output from the speaker 19 according to user settings. The dynamic image (e.g., dynamic effects) can include displaying a variety of shape and/or colors that change with time, such as a video or the like.

Additionally, the light sources 362 of the lighting device 36 can be controlled independently, or can be controlled at all at once. Each light source 362 can be controlled to have different colors and brightness. Accordingly, the panel 30 can implement a dynamic image using the lighting device 36.

Additionally, the home appliance 1 can be equipped with a speaker 19. The speaker 19 can be provided on the upper surface of the cabinet 10. The speaker 19 can be a Bluetooth speaker that can be linked with the remote device 2.

Each of the plurality of panels 30 can implement a moving image in conjunction with a sound source output from the speaker 19.

The artist collection control method provides a theme by combining colors, music, and effects previously selected by an artist in the field of art, such as fine art or music, and can implement the selected theme by controlling the lighting device 36 and speaker 19.

The artist collection control method includes providing a recommended theme (S30), receiving information about the theme selected by the user (S31), and controlling the lighting device 36 to implement the received theme (S32).

In other words, the artist collection control method includes providing a graphic object corresponding to a plurality of panels of the home appliance and a plurality of theme graphic objects each representing a plurality of themes (S30), receiving theme information including color information of a graphic object selected from the plurality of theme graphic objects (S31), and controlling the lighting device so that the panel shines according to the received color information (S32).

Additionally, the theme information further includes sound source information, and the controlling the lighting device can control the speaker to output according to sound source information.

In addition, the theme information further includes control information for varying the color and brightness of the plurality of light sources constituting the lighting device over time, and, in the controlling the lighting device, the panel can be controlled to implement dynamic effects according to control information.

In the providing a recommended theme (S30), a user interface U3 that allows the user to select a desired theme for a plurality of panels can be provided to the user's remote device 2.

Referring to (a) of FIG. 11, the fifth area A5 of the user interface U3 can display the shape of a refrigerator having a door combination corresponding to the home appliance currently being used by the user.

Additionally, a graphic object G10 to which the color currently being applied is applied can be displayed on each of the plurality of panels. This graphic object G10 can include a first door graphic object G11, a second door graphic object G12, a third door graphic object (G13), and a fourth door graphic object G14.

Graphic objects G20, G21, G22, G23, G24, G25, G26) for recommended themes can be displayed in the sixth area A6. Recommended themes can include dynamic effects through independent control of colors, sound sources, and lighting sources 36.

Graphic objects G20, G21, G22, G23, G24, G25, G26 can be displayed as images representing recommended themes. For example, representative works of artists can be displayed.

When a graphic object G20, G21, G22, G23, G24, G25, G26 is selected in the user interface U3, a description of the theme can be displayed. For example, information about the artist's profile, representative work images, music used in the theme, and colors can be displayed.

The color selected by the artist can include a color family selected in advance by the artist or represented in the image of the artist's work. Sound sources can also be selected in advance by the artist or can include sound sources that match the image of the artist's work.

Dynamic effects can be achieved by controlling the color and brightness of each light source of the lighting device 36 over time.

When the user selects one of the graphic objects (G20, G21, G22, G23, G24, G25, G26) representing the recommended theme, a state of the home appliance to which the theme is applied can be displayed in the fourth area (A4), as illustrated in FIG. 11(*b*).

When the use button B17 is clicked, the remote device 2 can transmit information about the theme to the controller 13. The controller 13 can control the lighting device 36 and the speaker 19 based on the received information.

Additionally, the user interface U3 can include a screen provided with buttons B18, B19, B20 for selecting the effect to be applied among the colors, music, and dynamic effects of the selected theme.

For example, the user can set only the color selection button (B18) of the theme to be turned on to apply only the color to the panel 30 and not apply music and dynamic effects to the panel 30.

In addition, the user can set the panel 30 to be implemented in the color of the theme and the sound source to be output from the speaker 19 device by only turning on the theme color selection button B18 and the music button B19. For instance, B20 can refer to a party mode, which can have a predetermined output of music/sound and/or colors, via the speaker and the lighting device 36.

The user interface U3 can include a button B21 for setting the time (e.g., operation time) for which the selected theme effect lasts. B21 can also refer to a user button, which includes various settings assigned to a particular user, such as operation time, color, and the like.

Figure 12:
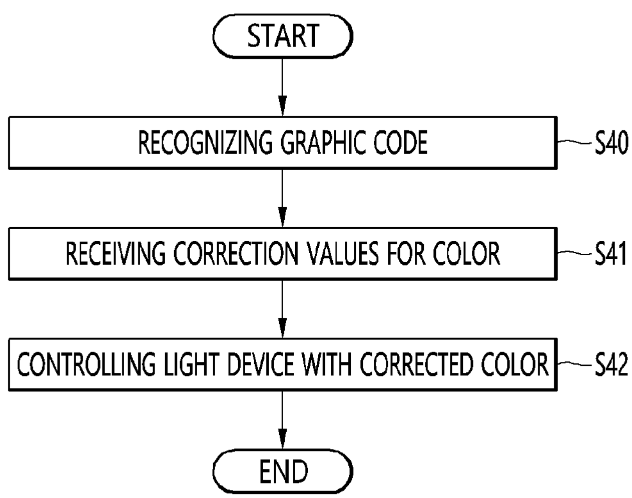
FIG. 12 is a flowchart for explaining a method of controlling a lighting device by reflecting the panel's own color according to the fourth embodiment.

FIG. 12 is a flowchart for explaining a method of controlling a lighting device by reflecting the panel's own color according to the fourth embodiment.

Meanwhile, the front plate 31 constituting the panel 30 can have its own unique color. In other words, when the lighting device 36 is turned off, the outer appearance the front surface of the door can be formed in the color of the front plate 31 itself.

When the lighting device 36 is turned on, the light emitted from the lighting device 36 passes through the front plate 31, and in this process, the color of the light emitted from the lighting device 36 and the color of the front plate 31 can be mixed. Accordingly, in order to implement the color desired by the user, the color of the lighting device 36 can be controlled by considering the color of the front plate 31.

The controller 13 can control the color of light emitted from the lighting device 36 so that the panel 30 is implemented in a color desired by the user.

A method of changing the color of the panel can include recognizing a graphic code that includes information of first color and obtaining a correction value for calculating information of second color.

The method for changing color of a panel can include recognizing a graphic code including information of first color and obtaining a correction value for calculating information of the second color.

In detail, the panel 30 can be provided with a graphical code that can identify unique information according to the color of the front plate 31 itself.

This graphic code can be a bar code or QR code and can be provided on the outer surface of the front plate 31.

The graphics code can include RGB values of the front plate 31. The graphic code can further include a correction value reflecting the color of the front plate 31. This correction value can be calculated by an experimental value using the RGB value to be implemented in the panel 30, the RGB value emitted from the lighting device 36, and the RGB value implemented in the panel 30 through the front plate 31 as variables.

At the manufacturing or assembling step of the home appliance 1, operators can recognize the graphic code through a remote device or the like (S40).

At this time, it is possible to check the correction value reflecting the color of the front plate 31 by linking with the server through the recognized graphic code.

The operator can transmit the RGB value of the front plate 31 and the correction value checked through a remote device or the like to the controller 13 through the communication portion 17. The controller 13 can store the received RGB values and correction values in the memory portion (S41).

The controller 13 can calculate the final corrected RGB color value by reflecting the correction value and processing the RGB value set by the user and the correction value.

Alternatively, the corrected RGB values can be received through a remote device or server connected to the controller 13. The controller 13 can control the lighting device 36 to emit corrected RGB color values (S42).

Accordingly, the panel 30 can be implemented to shine in a color desired by the user.

This color correction method can also be applied to a method of controlling the color of the panel through fine adjustment of color tone. In detail, when the user selects the control button B14 and makes fine adjustments, the RGB color correction value can be transmitted to the controller 13. The controller 13 can control the lighting device 36 with a calculated value that reflects the received correction value.

Figure 13:
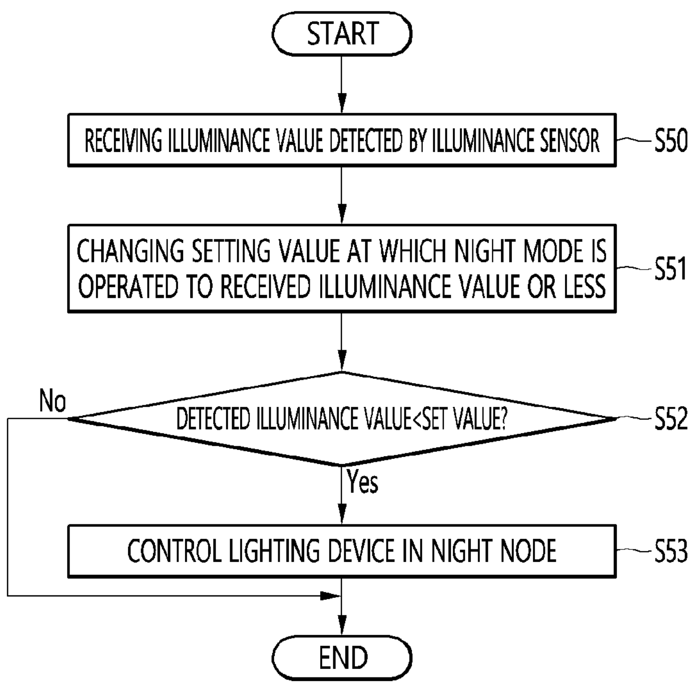
FIG. 13 is a flowchart for explaining a method of controlling an illumination sensor based on ambient brightness according to the fifth embodiment.

FIG. 13 is a flowchart for explaining a method of controlling an illumination sensor based on ambient brightness according to the fifth embodiment.

Meanwhile, home appliances can be equipped with an illuminance sensor 152 that detects surrounding brightness. According to the illuminance value detected by the illuminance sensor 152, the intensity of light emitted from the lighting device 36 can be adjusted.

For example, when the illuminance value detected by the illuminance sensor 152 is a set value or less, it is possible to recognize that the surrounding brightness is dark and the brightness of the panel 30 can be lowered. In other words, in a night environment, energy can be saved by turning off the lighting device 36 or adjusting the intensity of light to a low level. In this way, turning off the lighting device 36 or adjusting the intensity of light to low in a dark environment can be called night mode control.

Meanwhile, the amount of light detected can vary according to the location where the illuminance sensor 152 is installed in the home appliance 1 and the environment in which the home appliance 1 is placed. For example, the home appliance 1 is a built-in type and is installed inside the furniture cabinet, so the light entering the illuminance sensor 152 can be blocked. In this case, even though the surrounding environment is bright, it is recognized as a dark environment and the night mode is activated, so the brightness of the panel 30 can become dark.

In one embodiment of the present disclosure, the user can directly set the sensitivity of the illuminance sensor 152 to adjust the setting value at which the night mode is activated.

For example, the user can select the sensitivity of the illuminance sensor 152 from low, normal, or high through the remote device 2 or the manipulation portion 14. For example, as the sensitivity of the illuminance sensor 152 increases from low to high, the illuminance value at which the night mode is activated can decrease.

Alternatively, the user can correct the sensitivity of the illuminance sensor 152 through the remote device 2 or the manipulation portion 14.

The user can have the illuminance sensor 152 detect the current brightness through the remote device 2 or the manipulation portion 14 in an environment in which the night mode is desired to operate.

For example, when a user requests information about the illuminance value of the illuminance sensor 152 through the remote device 2, the controller 13 can transmit information about the illuminance value detected by the illuminance sensor 152 to the remote device 2 (S50).

Additionally, the user interface area displayed on the remote device 2 can display a prompt to select whether to operate the night mode when the illuminance is below the detected illuminance value (S51).

When the user selects to operate the night mode, the controller 13 can change the setting value for operating the night mode to the detected illuminance value or less (S52).

Accordingly, when the user wants the night mode to operate in an environment where the illuminance value detected by the illuminance sensor 152 is the set value or less, the controller 13 can lower the intensity of the light emitted from the lighting device 36 or turn off the lighting device 36 (S53).

In other words, the night mode can control the brightness of the lighting device to be dimmer than before when the illuminance value detected by the illuminance sensor is a set value or less.

This night mode step can include providing information about the illuminance value detected by the illuminance sensor, displaying a display to select whether to operate the night mode when the illuminance value is the detected illuminance value or less, when the user selects night mode operation, changing the setting value to a level the detected illuminance value or less.

Additionally, the method can further include activating the night mode when the illuminance value detected by the illuminance sensor is the changed setting value or less.

Alternatively, the user can set the time for the night mode to operate through the remote device 2 or the manipulation portion 14.

Meanwhile, the home appliance according to one embodiment can be provided with a lighting device inside the see-through portion 12. In addition, the see-through portion 12 can be selectively made transparent or opaque according to the user's manipulation through the lighting device.

Additionally, the lighting device of the see-through portion 12 can implement RGB colors by including an LED light source.

Additionally, the door 20 provided with the see-through portion 12 can be equipped with a lighting device 36 that causes the panel 30 to shine in a set color. In other words, the door 20 provided with the see-through portion 12 is provided with a lighting device 36 inside the panel 30 and a lighting device 36 inside the see-through portion 12, and can be controlled independently.

At this time, according to user settings, when the lighting device 36 within the panel 30 is turned on, the lighting device inside the see-through portion 12 can be controlled to be turned off. Accordingly, when the lighting device 36 of the panel 30 is turned on, the lighting device inside the see-through portion 12 is turned on, thereby preventing the inside of the refrigerator from being transparent.

Additionally, according to user settings, the lighting device inside the see-through portion 12 can be controlled to be turned on while the lighting device 36 within the panel 30 is turned on. At this time, the lighting device inside the see-through portion 12 can be the same as or similar to the lighting device 36 within the panel 30 or can be emitted with a harmonious color.

In this way, controlling the lighting device inside the see-through portion 12 to turn on and off can also be called insta-view control.

Figure 14:
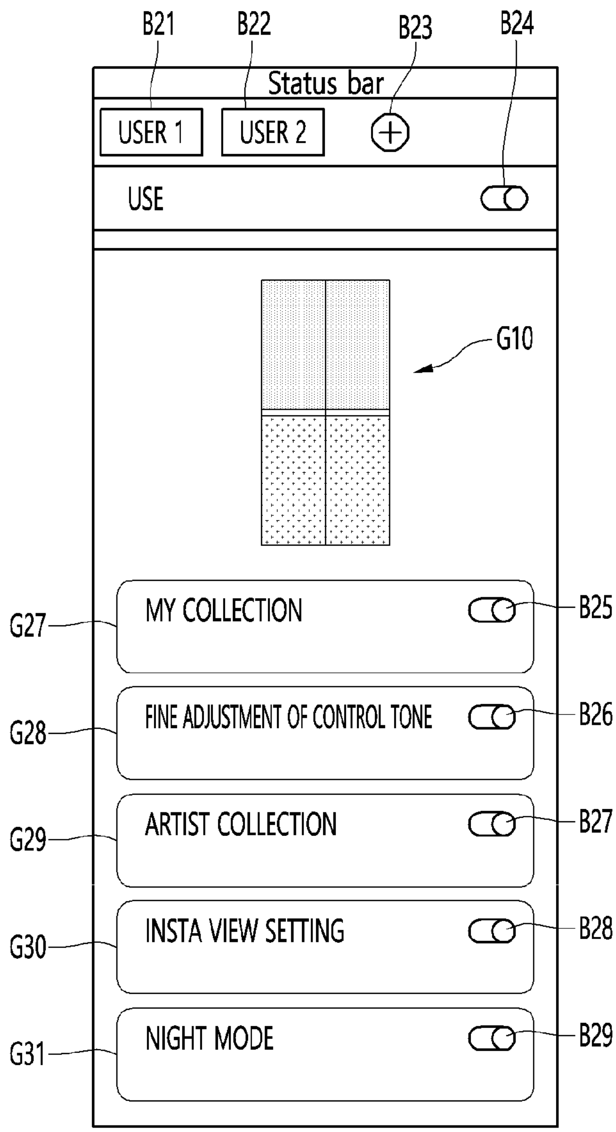
FIG. 14 is a diagram illustrating an example of a user interface for explaining a method of controlling a home appliance with a user customization function according to the sixth embodiment.

FIG. 14 is a diagram illustrating an example of a user interface for explaining a method of controlling a home appliance with a user customization function according to the sixth embodiment.

The home appliance 1 according to an embodiment of the present disclosure can set the color, brightness, or the like of the panel 30 preset by the user at once according to the user setting function.

As illustrated in FIG. 14, when the user selects the user button B21, B22 displayed on the remote device 2 or the home appliance 1, the home appliance can be controlled as preset for the selected user.

For example, when the user button B21 is selected, settings corresponding to the selected user can be displayed on the screen. This settings screen can include at least one of the previously described My Collection G27, Color Tone Fine Control G28, Artist Collection G29, Insta-View Settings G30, and Night Mode G31.

The user can change the color of the panel 30 or adjust the brightness by selecting each use button B25, B26, B27, B28, B29 displayed on the settings screen.

Additionally, the settings screen can further include a use button B24 that can operate all settings at once. If you select the use button B24, you can operate the home appliance in preset settings such as My Collection, Color Tone Fine Control, Artist Collection, Insta View Settings, and Night Mode.

Meanwhile, when the user selects the use button B25 displayed in My Collection G27, the color of the panel 30 can be changed to a color according to the preset My Collection G27. The color information of this My Collection can be set by the user in advance.

In detail, when the user selects the use button B25 of the My Collection G27, the remote device 2 can transmit color information set to My Collection through the communication portion 17. Based on the received color information, the controller 13 can control the lighting device so that the color of the panel 30 shines with the color set in My Collection.

When the user selects the use button B26 displayed on the color tone fine adjustment G28, the color of the panel 30 can be changed to a color according to the preset color tone fine adjustment G28.

When the user selects the use button B27 displayed in the artist collection G29, the color of the panel 30 can be changed to a color according to the preset artist collection G29. Additionally, sound sources according to a preset artist collection can be controlled to be output through the speaker. Additionally, dynamic effects can be implemented on the panel 30 according to a preset artist collection.

When the user selects the use button B28 displayed in the Insta View settings G30, the home appliance can be controlled with the preset Insta View settings. For example, when the panel 30 shines by the lighting device being operated, the lighting device inside the see-through portion 12 can be controlled to be turned off.

When the user selects the use button B29 of the night mode G31, the brightness of the panel 30 can be adjusted according to the preset night mode.

When the user selects the use button B25, B26, B27, B28, B29, it can be displayed on the graphic object G10 that the home appliance changes to a set state in conjunction with this.

These user buttons B21, B23 can be used to add users by selecting the add button B23 as needed.

In this way, the desired color and the corresponding control functions can be set and stored in advance, and an interface can be provided where the user can change all the desired settings at once using the user setting function.

Users can update new features of home appliances through remote devices. Home appliances can add new functions through updates with the server. For example, the remote device 2 can download a program storing a user interface capable of implementing the above-described embodiments through an update.

Such a user interface can be written as a program that can be executed on a user's remote device or computer. The remote device 2 can download and run these programs through the server.

The communication portion 17 of the home appliance is connected to a server, so that programs with new functions can be downloaded. These programs can include information for implementing the user interface described above.

Figure 15:
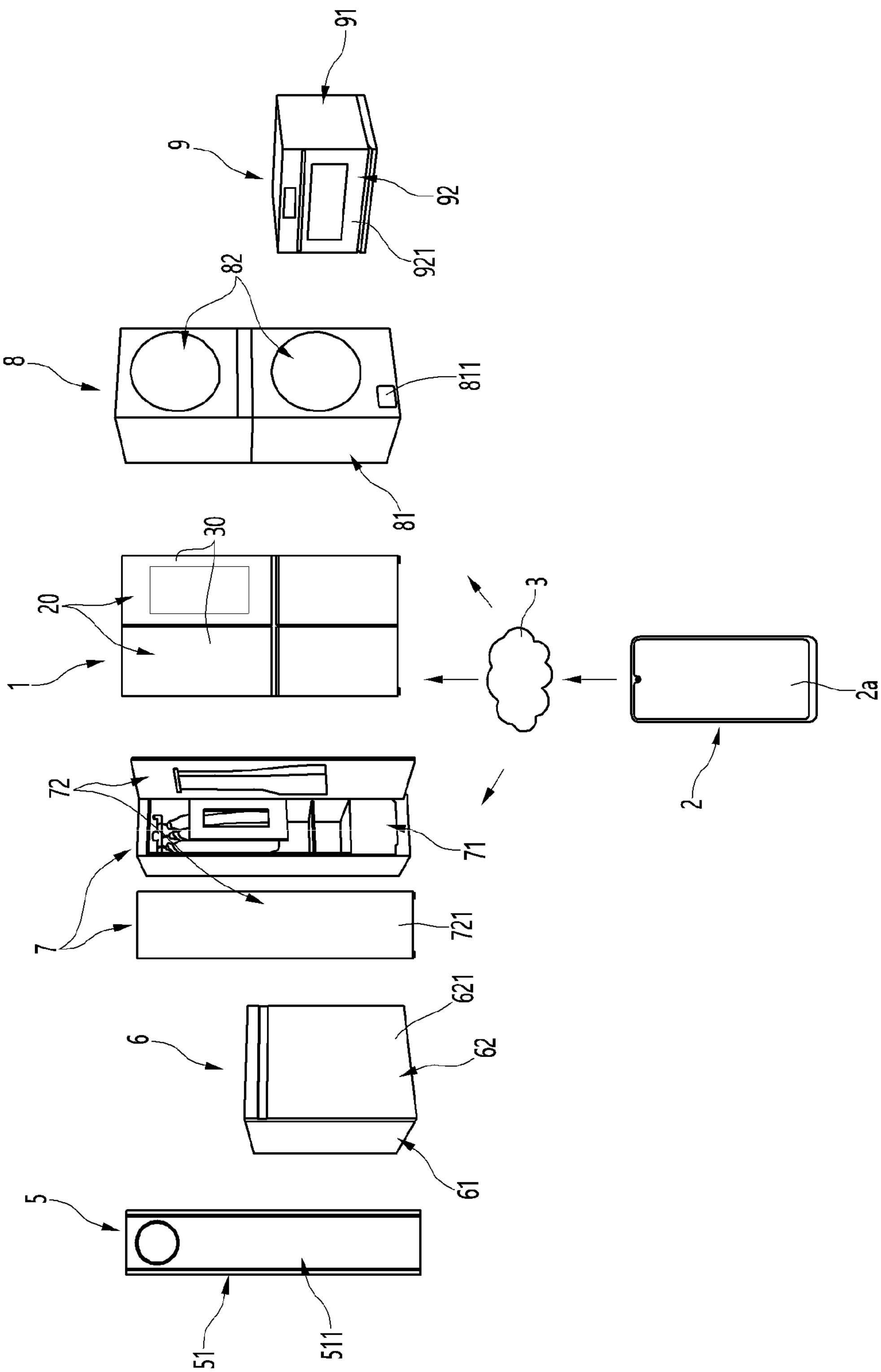
FIG. 15 is a diagram illustrating an example of adjusting the colors of home appliances using a remote device.

FIG. 15 is a diagram illustrating an example of adjusting the colors of home appliances using a remote device.

The home appliance according to an embodiment of the present disclosure can have an outer appearance formed by the panel 30, and the outer appearance can be changed to a color set by the user according to the operation of the lighting device 36.

For example, such a home appliance can be any one of a refrigerator 1, an air conditioner 5, a dishwasher 6, a clothes care machine 7, a washing machine 8, or a cooking appliance 9. Each of these has the same structure as the panel 30 of the embodiment of the present disclosure, so that the color of the outer appearance of the front surface can be freely changed.

In the refrigerator 1, a panel 30 can be provided on the front surface of the door 20 that opens and closes the cabinet 10.

The indoor unit of the air conditioner 5 can have a space provided with a heat exchange device and a fan inside the case 51 that forms the outer appearance. The front surface of the case 51 can be formed by a panel 511.

The dishwasher 6 can have a space for washing dishes inside the case 61 that forms the outer appearance. The front surface of the case 61 can be opened and closed by the door 62, and the front surface of the door 62 can be formed by the panel 621.

The clothes care machine 7 can include a case 71 that forms a space for storing clothing, and a door 72 that opens and closes the front surface of the case 71. The front surface of the door 72 can be formed by a panel 721.

The washing machine 8 or dryer can include a case 81 providing a space for washing or drying, and a door 82 that opens and closes the case 81. The front surface of the case 81 can be formed by a panel 811.

The cooking appliance 9 can include a case 91 with a space for cooking food, and a door 92 that opens and closes the case 91. The front surface of the door 92 can be formed by a panel 921.

These home appliances can have their panels glow in a color set by the user.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

Various embodiments described herein can be implemented in a computer-readable medium using, for example, software, hardware, or some combination thereof. For example, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions can be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

The present invention being thus described, it will be obvious that the same can be varied in many ways. Such variations are not to be regarded as a departure from the spirit and scope of the present invention, and all such modifications as would be obvious to one skilled in the art are intended to be included within the scope of the following claims.

What is claimed is:

1. A method for changing a color of a home appliance, the method comprising:

displaying a user interface on a display panel of the home appliance, the user interface including:

graphic objects corresponding to a plurality of panels of the home appliance; and color control buttons for controlling a color displayed on the plurality of panels;

receiving a selection, via the user interface, of one of the plurality of panels and an input to the color control buttons; and controlling a lighting device of the home appliance to make the selected panel display color in accordance with the input to the color control buttons, wherein each of the plurality of panels has a first color when the lighting device is turned off, and wherein the controlling the lighting device includes emitting light, by the lighting device, in a second color so that the selected panel displays a third color according to the input of the color control buttons.

2. The method of claim 1, wherein the color control buttons are configured to just red (R), green (G), and blue (B) values of color displayed on the selected panel.

3. The method of claim 2, wherein the color control buttons includes a red slider, a green slider and a blue slider, and wherein the input to the color control buttons includes adjusting at least one of the red slider, the green slider and the blue slider.

4. The method of claim 1, wherein the input of the color control buttons includes adjusting a saturation or brightness of the color displayed on the selected panel.

5. The method of claim 1, further comprising:

recognizing, via a remote device, a graphic code display on the home appliance, the graphic code including information of the first color; and obtaining, via a controller of the home appliance, a correction value for calculating information of the second color.

6. A method for changing a color of a home appliance, the method comprising:

displaying a user interface on a display panel, the user interface including:

graphic objects corresponding to a plurality of panels of the home appliance; and a plurality of theme graphic objects;

receiving a selection, via the user interface, of one of the plurality of panels and one of the plurality of theme graphic objects; and controlling a lighting device of the home appliance to make the selected panel display color in accordance with theme information corresponding to the selected theme graphic object, wherein each of the plurality of panels has a first color when the lighting device is turned off, and wherein the controlling the lighting device includes emitting light, by the lighting device, in at least one second color so that the selected panel displays at least one third color according to an input of the selected theme graphic object.

7. The method of claim 6, wherein the theme information includes sound source information, and wherein the method further comprises controlling a speaker of the home appliance to output sound in accordance with the sound source information.

8. The method of claim 6, wherein the lighting device includes a plurality of light sources, wherein the theme information includes control information for varying color and brightness of the plurality of light sources over time, and wherein the controlling the lighting device further includes implementing dynamic effects on the selected panel according to the control information by displaying a plurality of changing colors and/or shapes.

9. The method of claim 8, further comprising controlling the home appliance to be in a night mode in response to an illuminance value, detected by an illuminance sensor of the home appliance, being below a predetermined illuminance value, wherein the night mode includes reducing a brightness of the lighting device to a preset brightness value.

10. The method of claim 8, further comprising:

displaying, on the user interface, information about an illuminance value detected by an illuminance sensor of the home appliance;

displaying, on the user interface, a night mode selection button, in response to the detected illuminance value being a predetermined illuminance value or less; and lowering a brightness emitted by the lighting device to a preset brightness value, in response to a user selecting the night mode selection button.

11. The method of claim 6, further comprising:

displaying, on the user interface, an add color button for adding a new color to the home appliance;

displaying, on the user interface, a plurality of color selection buttons, the plurality of color selection buttons including a red button, a green button and a blue button; and changing a color displayed on the selected panel in response to a selection of at least one of the red button, the green button and the blue button.

12. The method of claim 6, further comprising displaying a selecting button for setting an operation time at which the lighting device is operated, and wherein, in the controlling the lighting device, the lighting device operates according to the set operation time.

13. A home appliance, comprising:

a cabinet including a storage space;

a door configured to open and close the storage space, the door including:

a panel forming a front surface of the cabinet; and a lighting device configured to emit light;

a user interface including a color control button for controlling a color displayed on the panel; and a controller configured to control the lighting device to change the color displayed on the panel according to an input to the color control button, wherein the panel has a first color when the lighting device is turned off, and wherein the controller is controlled to control the lighting device to emit light in a second color so that a third color is displayed on the panel, according to the input to the color control button.

14. The home appliance of claim 13, further comprising a speaker, wherein the controller is further configured to:

receive sound source information selected by a user; and control the speaker to output sound according to the sound source information.

15. The home appliance of claim 13, wherein the lighting device includes a plurality of light sources, and wherein the controller is configured to control the lighting device to vary a color and brightness of the plurality of light sources over time.

16. The home appliance of claim 13, further comprising an illuminance sensor, wherein the controller is further configured to:

display, on the user interface, information about an illuminance value detected by the illuminance sensor;

display, on the user interface, a night mode selection button, in response to the detected illuminance value being a predetermined illuminance value or less; and control the lighting device to lower a brightness output by the lighting device to a preset brightness value, in response to a user selecting the night mode selection button.

17. The home appliance of claim 13, wherein the controller is configured to:

display, on the user interface, an add color button for adding a new color to the home appliance;

display a plurality of color selection buttons in response to selection of the add color button, the plurality of color selection buttons including a red button, a green button and a blue button; and change the color displayed on the selected panel in response to a selection of at least one of the red button, the green button and the blue button.

18. The home appliance of claim 13, wherein the controller is further configured to:

display a selecting button for setting an operation time at which the lighting device is operated; and control the lighting device according to the selected operation time.

* * * * *